United States Patent [19]

Baymak et al.

[11] Patent Number: 4,993,666
[45] Date of Patent: Feb. 19, 1991

[54] PIVOTABLE SEAT, ESPECIALLY FOR A FLIGHT ATTENDANT

[75] Inventors: Faruk Baymak, Hamburg; Klaus Lasch, Stade; Helmut Stueben, Gruenendeich; Hanno Zestermann, Hamburg, all of Fed. Rep. of Germany

[73] Assignee: Messerschmitt-Boelkow-Blohm GmbH, Ottobrunn, Fed. Rep. of Germany

[21] Appl. No.: 214,722

[22] PCT Filed: Sep. 19, 1987

[86] PCT No.: PCT/DE87/00424
§ 371 Date: Jun. 30, 1988
§ 102(e) Date: Jun. 30, 1988

[87] PCT Pub. No.: WO88/01967
PCT Pub. Date: Mar. 24, 1988

[30] Foreign Application Priority Data

Sep. 19, 1986 [DE] Fed. Rep. of Germany ....... 3631726
Sep. 23, 1986 [DE] Fed. Rep. of Germany ....... 3632288

[51] Int. Cl.⁵ .............................................. B64D 11/06
[52] U.S. Cl. .................................. 244/122 R; 297/13; 297/14; 297/331
[58] Field of Search .................. 244/122 R, 118.6; 297/13, 14, 43, 315, 331, 332, 333, 335, 484

[56] References Cited

U.S. PATENT DOCUMENTS

| | | | |
|---|---|---|---|
| 330,223 | 11/1885 | Gaylord | 297/13 |
| 656,583 | 8/1900 | Levin | 297/13 |
| 2,177,263 | 10/1939 | Noe | 297/14 |
| 3,131,964 | 5/1964 | Reed | 297/43 |
| 3,594,037 | 7/1971 | Sherman | 297/14 |
| 4,460,215 | 7/1984 | Chamberlain et al. | 297/14 |
| 4,740,030 | 4/1988 | Nordskog | 297/14 |

FOREIGN PATENT DOCUMENTS 804010 10/1936 France .

Primary Examiner—Galen Barefoot
Attorney, Agent, or Firm—W. G. Fasse; D. H. Kane, Jr.

[57] ABSTRACT

In a pivotable seat especially for a flight attendant in an aircraft, the backrest and the seat part are constructed to be pivotable together about an approximately vertical axis when the seat part is pivoted about an approximately horizontal axis into an upright position. The seat is secured to a carrying structure of the aircraft. The seat plate (25) and the backrest carrier plate (27) are milled parts. A spring is activated by tilting the seat part (2) into an upright position, whereby the seat 1 is biased into a recess (15) for storage. For pivoting the seat out of the use position into the recess (15) during non-use, only the locking of the seat part must be released and the seat part tilts itself into the vertical position, whereby the mentioned spring is activated for pivoting the seat into the recess (15) and locking it automatically in the recess.

5 Claims, 9 Drawing Sheets

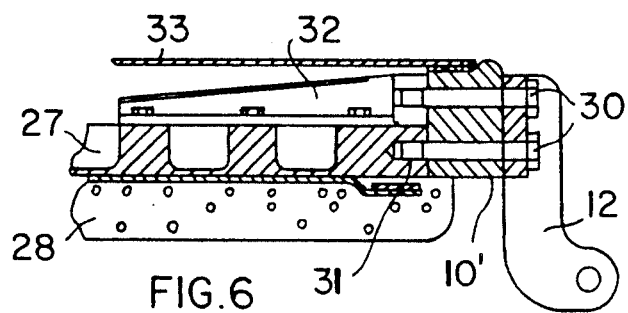
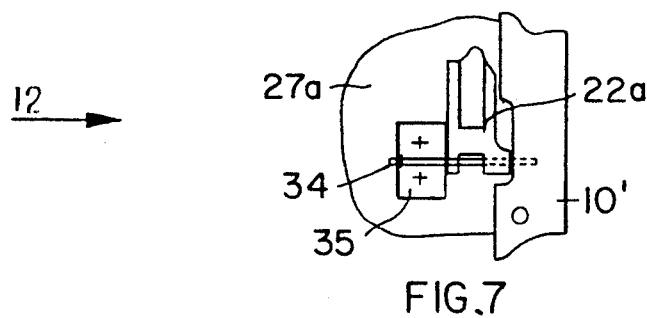
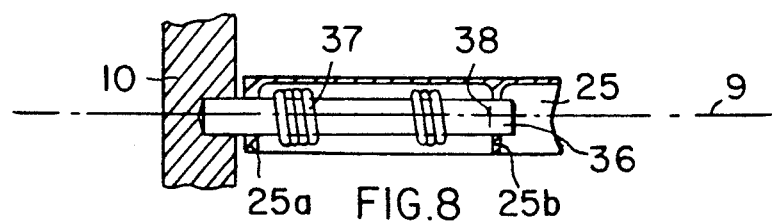
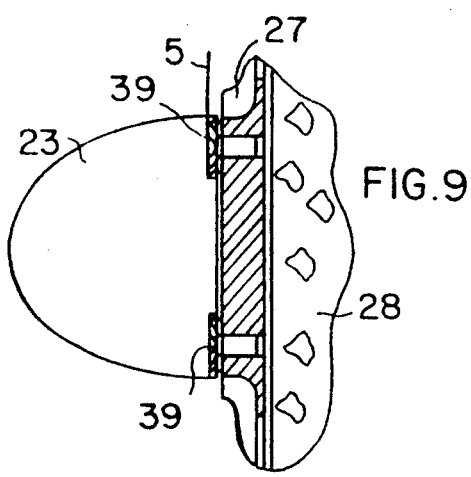

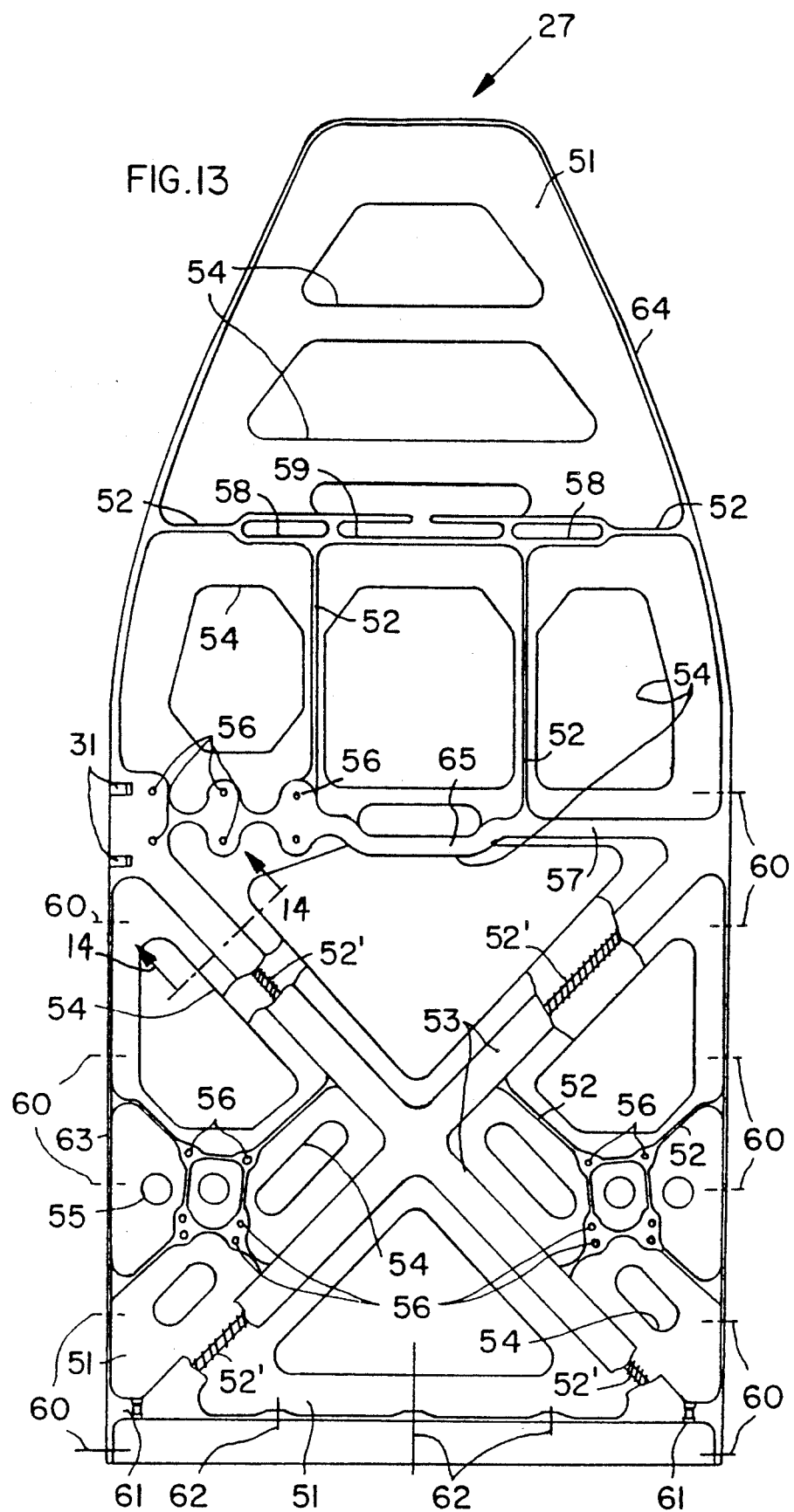

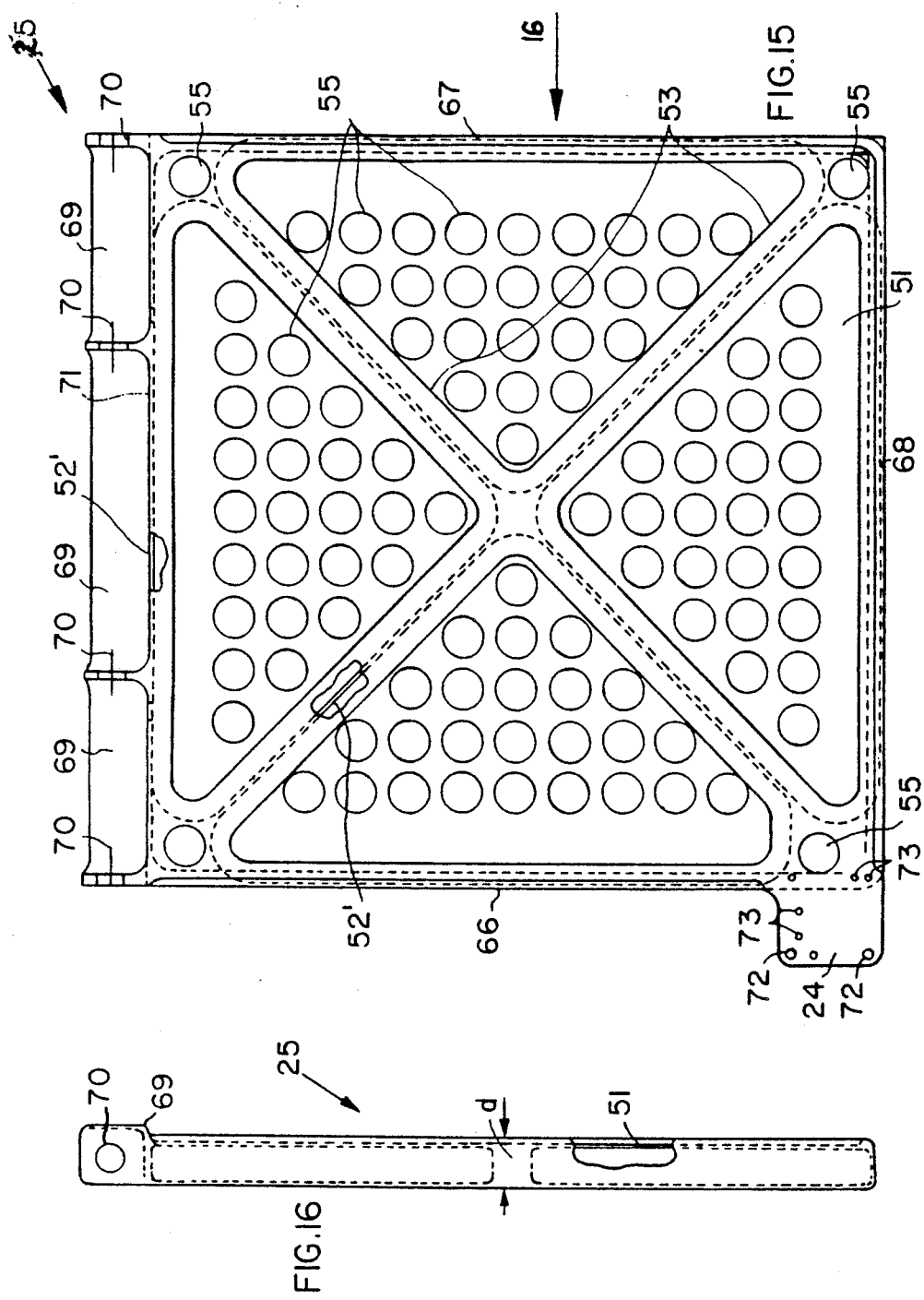

PIVOTABLE SEAT, ESPECIALLY FOR A FLIGHT ATTENDANT

FIELD OF THE INVENTION

The invention relates to a foldable seat especially for use by a flight attendant in an aircraft.

BACKGROUND INFORMATION

Prior seats of this type comprise an inner frame for taking up any loads which are active on the seat and an outer covering for appropriately defining the shape of the seat. In this context it is known to produce the carrying frame, for example as a welded construction of light metal tubes or profile sections, or as a cast part of a corresponding light metal alloy.

For the welded construction a relatively large number of separate parts must be produced, prepared, and connected with each other in several welding operations, whereby this manner of production entails a high labor cost.

In the case where the carrying parts of the seat are produced as cast parts, the possibility exists to construct the respective part as a single component with all the details. However, it must also be considered that, for cast parts for reasons of material strength, material additions are necessary which have a disadvantageous effect with regard to the weight. Besides, cast parts still require a milling operation. Furthermore, on the one hand the use of the die casting process is only economically worthwhile for relatively large numbers of parts due to the high costs of a corresponding mold, and on the other hand, the use, for example, of a high quality casting process entails high labor costs even for small numbers of parts.

Because of the permit requirements for seats in aircrafts, the production thereof requires exhaustive production controls including X-ray examinations of welded constructions and of cast parts.

It has been observed that prior seats of this type have the habit that, after the seat has been pivoted into its recess, the seat could tilt itself out of its recesses again, if the pivoting into the recess is not carried out according to the proper method, that is to say, until secure locking is achieved Thus, in an emergency situation the seat might block an important escape route or hinder rescue measures

OBJECT OF THE INVENTION

Accordingly, it is the object of the invention to construct a seat of the above general type in such a manner, that it may be produced at lower costs and with a lower weight while posing a lower accident risk while still meeting the above mentioned permit requirements.

SUMMARY OF THE INVENTION

According to the invention there is provided a pivotable seat, especially for a flight attendant in an aircraft, wherein a backrest with a seat part is constructed for pivoting about an approximately vertical axis and the seat surface is constructed for pivoting about an approximately horizontal axis secured to a carrying structure of the aircraft, characterized in that carrying parts of the seat, such as the seat plate and the back plate, are constructed as one-piece milled parts and/or a spring is provided which is activated by tilting up the seat part and pivots the seat into a recess.

The suggested seat may be produced at a lower cost and has a lower weight as compared to prior seats. In order to pivot the seat out of the use position into a recess for storage during non-use, only the locking of the seat part must be released, whereby, the seat part tilts itself into the vertical position thereby activating a spring which pivots the seat into the recess. The locking in the pivoted-in position is achieved automatically.

In addition to the advantage of effectively storing the seat even under unfavorable space conditions, known as compared to from pivotable seats, the suggested seat has the further advantage that malfunctions cannot arise as they tend to do in seats which are manually pivotable.

BRIEF DESCRIPTION OF THE DRAWINGS

The invention shown in the drawings will now be described in detail by way of example, with reference to the accompanying drawings, wherein:

FIG. 6 shows a section 6—6 according to FIG. 3;

FIG. 7 shows a bearing support of a locking lever for holding the seat in its recess;

FIG. 8 shows a section 8—8 according to FIG. 4;

FIG. 9 illustrates an attachment of an automatic belt retraction roller to a backrest carrier plate;

FIG. 13 shows the carrying part or frame for the backrest;

FIG. 15 shows the carrying part or frame for the seat surface; and

FIG. 16 is a view in the direction of arrow 16 in FIG. 15.

DETAILED DESCRIPTION OF PREFERRED EXAMPLE EMBODIMENTS AND OF THE BEST MODE OF THE INVENTION

Figure 1:
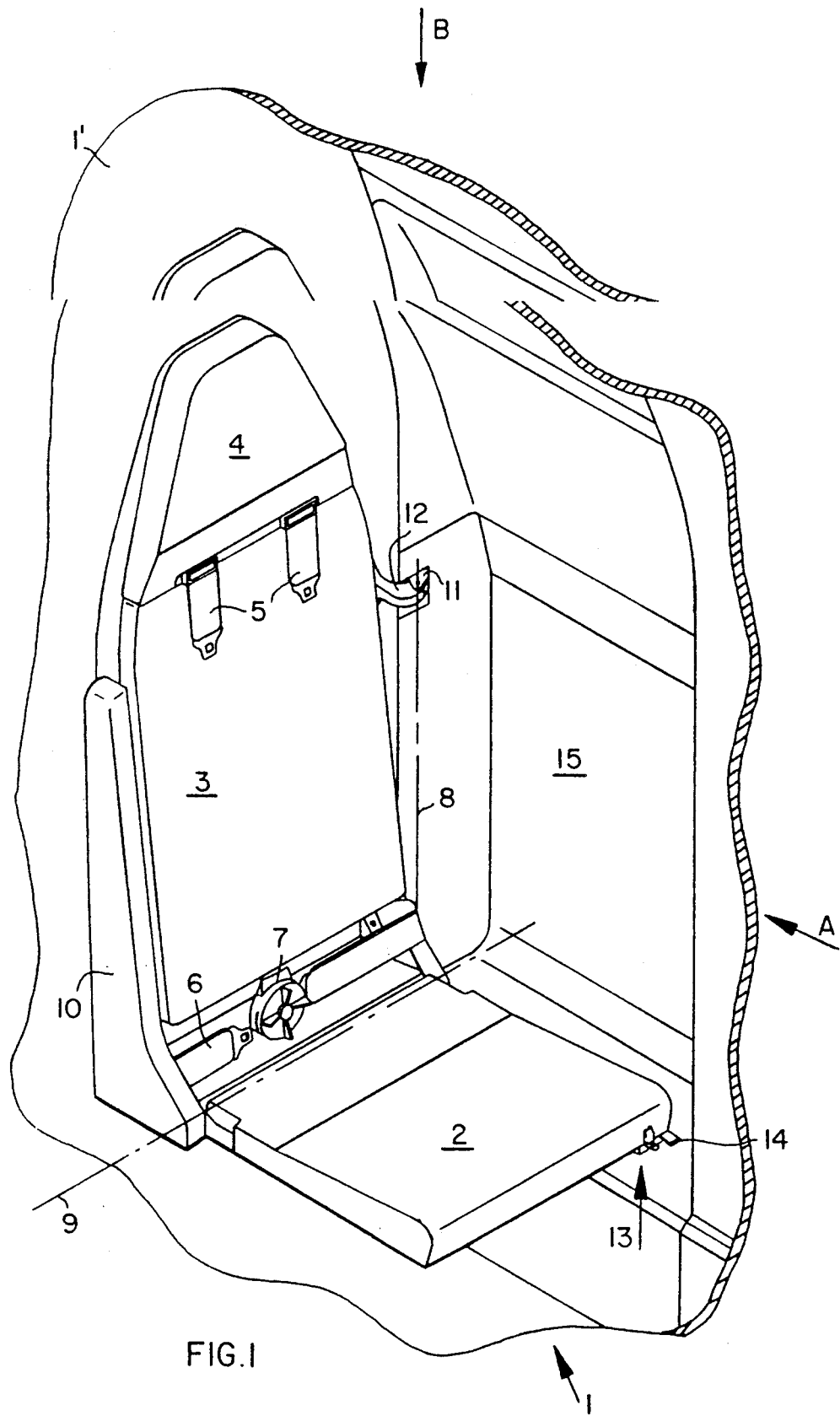
FIG. 1 is a perspective view of the present seat ready for use.

FIG. 1 shows a seat 1 comprising a seat part 2, a backrest 3, a head support 4, and a belt system including two shoulder belts 5, a two-piece lap belt 6 with a central lock 7 which also receives the ends of the shoulder belts 5. Two side struts of which only the visible left side strut 10 is shown, are located one on each side of the backrest 3. The seat part 2 is supported to be tiltable about an approximately horizontal axis 9 within the side struts. The backrest 3 with the seat part 2 is in turn constructed to be tiltable about an approximately vertical axis 8. Two hinge connections or joints are provided for this purpose, whereby the upper one is visible in the Figure. The upper hinge connection or joint comprises a fitting 11 connected to the aircraft structure and a seat side fitting 12. In its position ready for use as shown in FIG. 1, the seat 1 is connected at three points to the aircraft structure, namely at the above described hinge connections 8 and 9 and at a bearing point which is located under the right corner of the seat part 2 as shown in the Figure. Here, the seat part 2 is releasably connected with the aircraft structure 1' by means of a locking mechanism 13 operable by a lever 14. When the seat 1 is not needed, it may be pivoted into a recess 15 by rotation about the axis 8 after the seat part 2 has been tilted up. In order to achieve this, first the locking mechanism 13 is released by means of the lever 14 so that the seat part 2 is tilted into the vertical storage position by means of a spring force. Thereupon, the entire seat 1 is pivoted into the recess 15. When the seat 1 is fully pivoted into the recess 15, a further lock catches automatically, whereby the seat 1 is fixed in its storage position.

Figure 2:
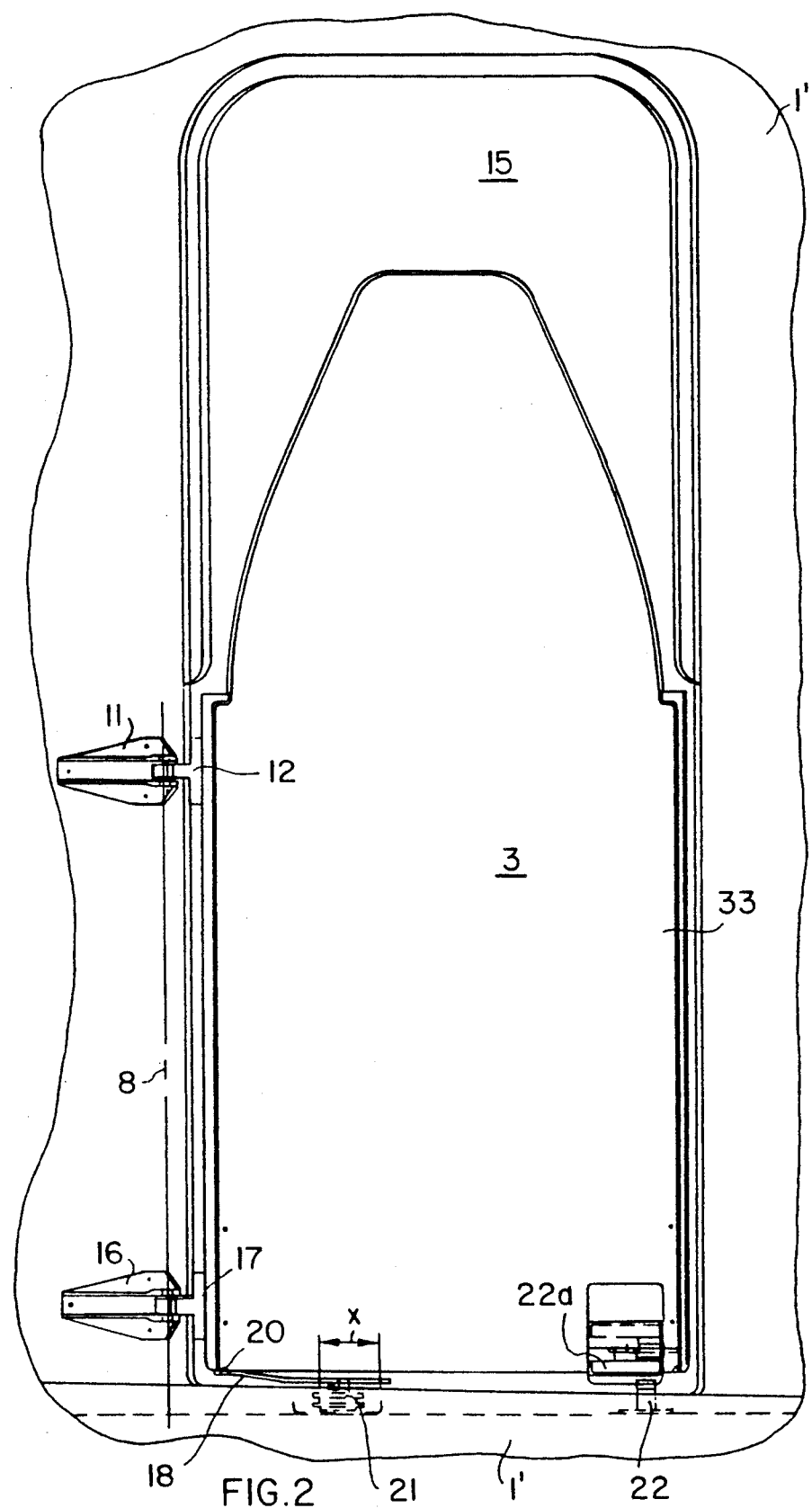
FIG. 2 is the seat of FIG. 1 pivoted into its recess, whereby the back of the seat is visible.

FIG. 2 shows the seat 1 in a pivoted-in position, whereby the backside of the backrest 3 with its covering 33 and the recess 15 in the aircraft structure are visible. FIG. 2 also shows the hinging axis 8 with the upper hinge joint comprising the fittings 11 and 12 while the lower joint comprises the fittings 16 and 17. A stop loop 18 hinged at its one end to a point 20 to the backrest 3 and comprising at its other end a slot hole of the length x. A bolt 21 is arranged on the side of the aircraft structure 1' and reaches into the slot hole for guiding the stop loop 18. The pivoting angle of the seat 1 is defined by the length x of the slot hole. A tapered pin 22 is furthermore arranged in the aircraft structure 1' for fixing the seat 1 in both positions. For fixing the seat 1 in the pivoted-in or stored position, the tapered pin 22 cooperates with a locking lever 22a. For unlocking out of this position, the locking lever 22a is pressed upwardly, whereby the locking is released and the seat 1 may be pivoted out of the recess 15.

Figure 3:
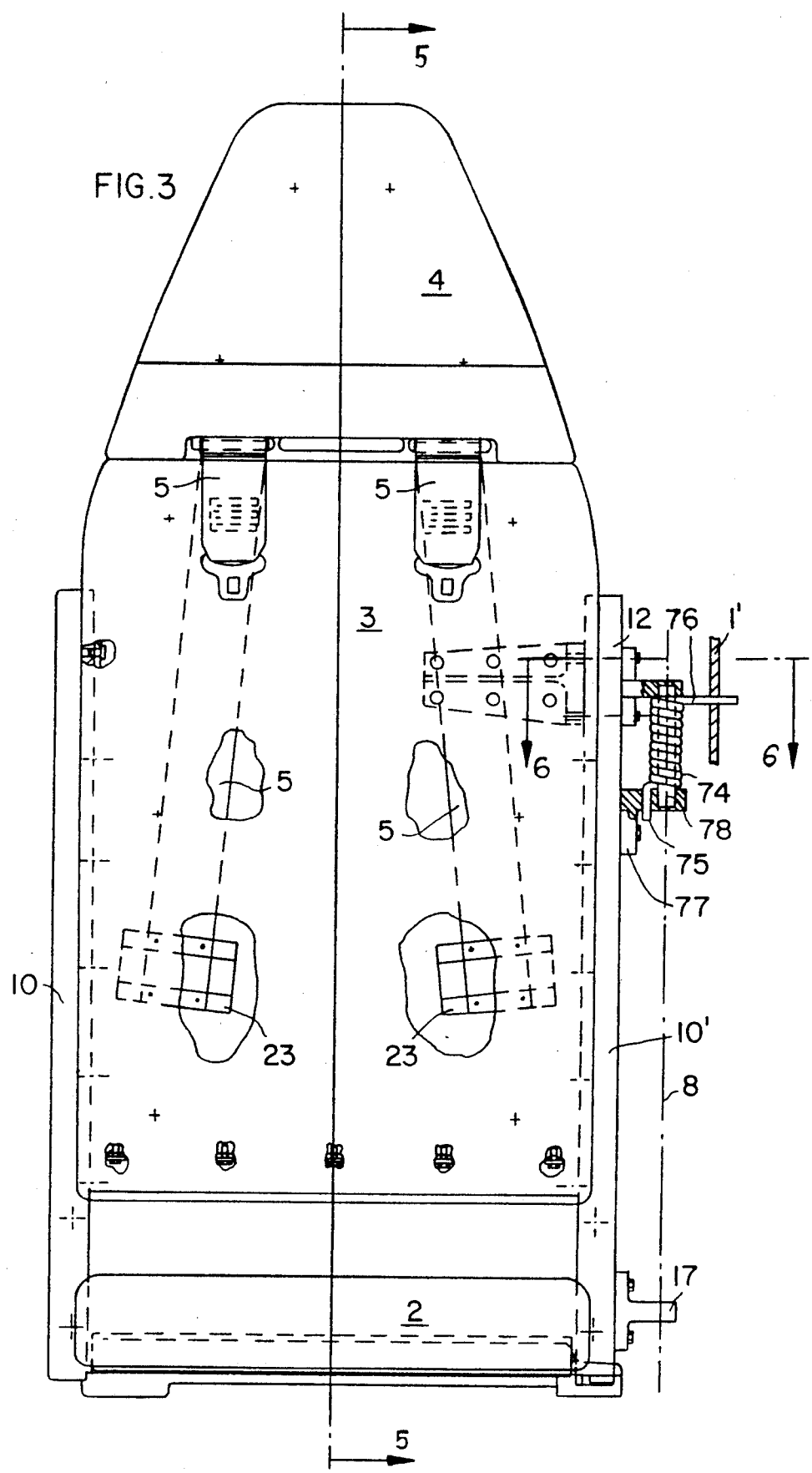
FIG. 3 is a view in the direction of arrow A shown in FIG. 1, whereby the backrest, headrest, and hinging structure are visible.

FIG. 3 shows the view in the direction of the arrow A shown in FIG. 1 without the surrounding aircraft structure 1', with the backrest 3, the tilted-out seat part 2, the head support 4, the side struts 10 and 10', the two shoulder belts 5, and the hinge fittings 12 and 17. The dashed lines the course of the parts of the shoulder belts 5 which are not visible and which are each connected to an automatic belt retracting roller 23. A helical spring 74 with stop shanks 75, 76 is provided for pivoting the seat into the recess 15 of the aircraft structure 1'. The shank 75 of the spring 74 is supported against the fitting 77 and of which the shank 78 bears against the aircraft structure 1', whereby, the spring 74 is guided by the bearing or hinging bolt 78.

Figure 4:
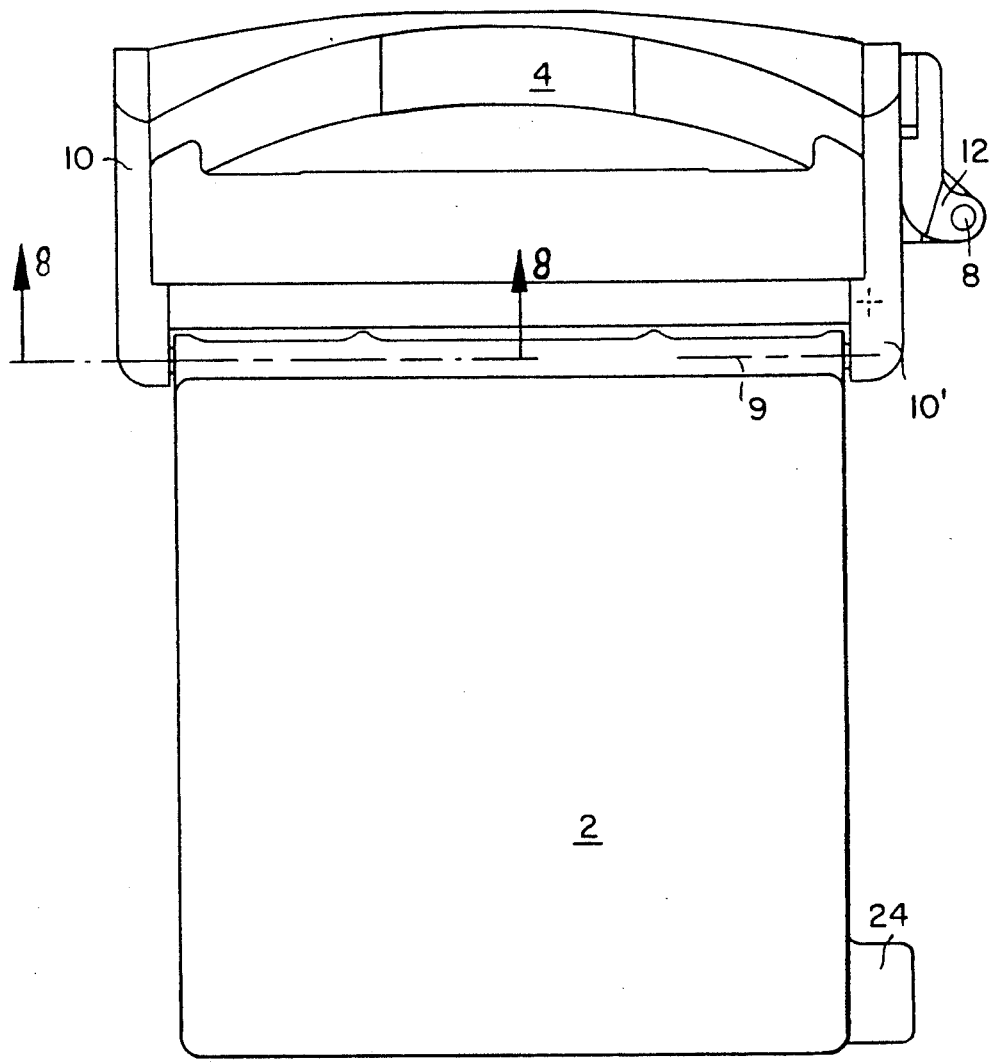
FIG. 4 is a view in the direction arrow B shown in FIG. 1.

FIG. 4 shows a view in the direction of the arrow B in FIG. 1, thereby essentially showing a top view onto the seat part 2 with the side struts 10, 10', the head support 4, and the hinge fitting 12 of the vertical hinge. An extension 24 for receiving the locking mechanism 13 with the lever 14, is integrated into the a seat carrying plate 25 of the seat part 2.

Figure 5:
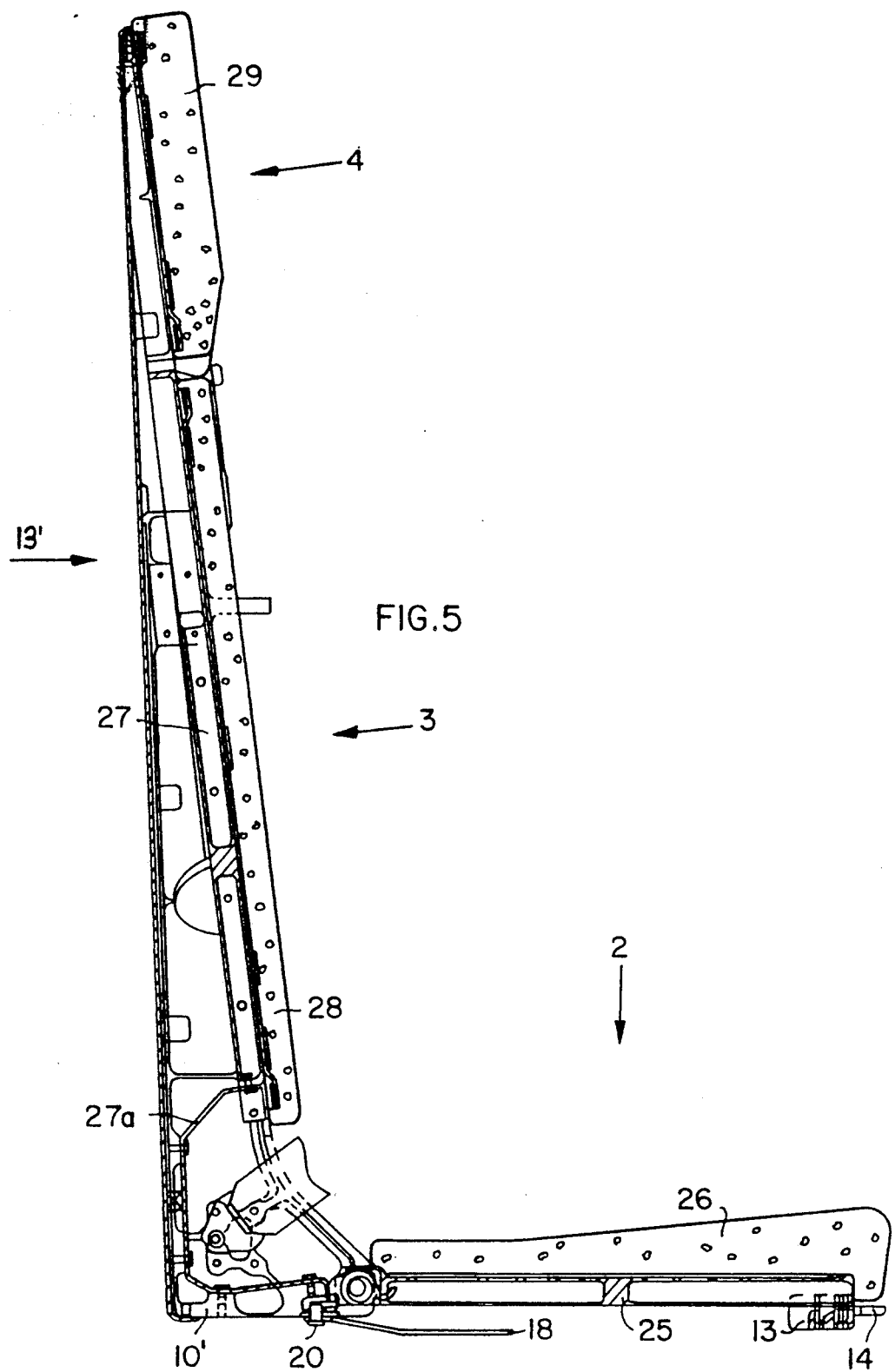
FIG. 5 shows a section 5—5 according to FIG. 3.

FIG. 5 shows the section 5—5 according to FIG. 3, with the seat part 2, the backrest 3, and the head support 4, whereby individual elements of the above named components are visible. Thus, the seat part 2 essentially comprises the seat carrying plate 25 and a seat cushion 26. The backrest 3 and the head support 4 are integrated into one structural group or unit by a common backrest carrier plate 27 supporting a back cushion 28 and a head cushion 29. The cushions 26, 28, 29 are produced of a suitable foam material. The locking mechanism 13 with the lever 14 is attached to the seat plate 25. The plates 25 and 27 are constructed as milled parts produced of an appropriate light metal alloy. The side struts 10, 10' are embodied in a similar advantageous manner. A belt pan 27a is embodied as a sheet metal part and is connected by screws to the bottom edge of the backrest carrier plate 27 as well as to the side struts 10.

FIG. 6 shows in section the attachment of the hinge fitting 12 to the backrest carrier plate 27 by four screws 30 of which the two upper screws are visible. The screws 30 pass through corresponding bored through holes in the side strut 10' and are screwed to the backrest carrier plate 27 and to a fitting 32, which comprise corresponding inside threads 31. FIG. 6 further shows the backrest cushion 28 and a rear covering 33 also visible in FIG. 2.

FIG. 7 shows the support of the locking lever 22a, comprising a pin 34 set into the side strut 10' and supported by means of a fitting 35 screwed to the belt pan 27a.

FIG. 8 shows a section view of details of the support of the seat part 2 about the axis 9 with a hinge pin 36 which rests in the wall 25a and a rib 25b on the side of the seat plate 25 and which is pushed into an appropriate, bored hole within the side strut 10. A corresponding arrangement is provided on the opposite side of the plate 25. The moment for biasing the seat part 2 into the upright position is applied by two helical springs 37 of which one is shown here. One shank of the spring 37 engages a rib, not shown, of the plate 25, whereas the other shank of the spring contacts a stop which is not visible here, but which is located on the belt pan 27a. After the pin 36 is mounted, it is secured by a split pin inserted into a bored hole 38.

FIG. 9 shows in section a detail of the backrest carrier plate 27 supporting the cushion 28 with one of the two automatic belt retracting rollers 23 for a shoulder belt 5. The automatic retractor 23 is attached to the plate 27 by means of screws 39. The pertinent area of the plate 27 is strengthened for taking up any possibly arising belt forces.

Figure 10:
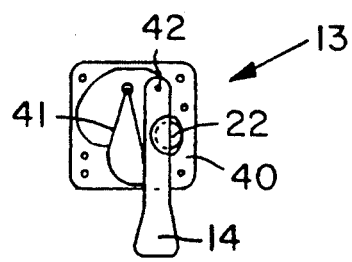
FIG. 10 is a locking mechanism for holding the seat in its recess.

FIG. 10 shows the locking mechanism 13 for locking seat part 2 in its horizontal use position. The mechanism 13 cooperates with the tapered pin 22 and essentially comprises the mentioned locking lever 14, a housing 40, and a helical spring 41 with shanks for causing a left rotating counterclockwise moment as seen in the FIG. 10 on the lever 14 about the rotation point 42. The lock 13 is shown together with the tapered pin 22. The pin 22 comprises a side slot of the thickness of the lever 14 at the location of contact with the lever 14 in such a manner that the lever 14 can reach approximately half way into the pin 22. In order to fix the seat 1 in the horizontal use position, the seat part 2 must simply be tilted downwardly, whereby, the lever 14 abuts against the tapered surface of the tapered pin 22 and glides along thereon until the lever 14 catches in said slot. Now, the seat part 2 is rigidly connected with the aircraft structures 1' and can only be released again in that the lever 14 is manually pivoted out of the slot against the bias of the spring 41.

Figure 11:
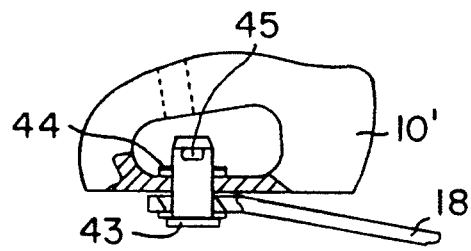
FIG. 11 is the mounting of a stop loop also shown in FIG. 2.

FIG. 11 shows the attachment of above mentioned stop loop 18 to the side strut 10'. For this purpose, a bolt 43 with a washer 44 is provided secured by a split pin 45.

Figure 12:
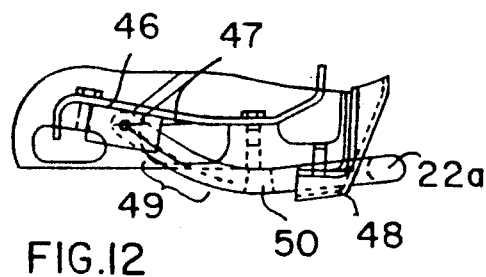
FIG. 12 is a view in the direction of the arrow 12 onto the bearing support of FIG. 7.

FIG. 12 shows the locking lever 22a in a side view with its rotation or journalling point 46. The lever 22a protrudes through an opening located in a recess. A leg helical spring 47 applies a right rotating or clockwise moment as seen in FIG. 12 to the lever 22a which comprises a bow-shaped section 49, whereby the lever 22a rests against a contact stop 48. At its lowest point, the lever 22a comprises a tapered bored hole 50. During pivoting of the seat 1 into the storage position, the lever 22a approaches the tapered pin 22 and contacts it with its bow-shaped section 49, whereby the lever 22a deflects upwardly until the location of the tapered bored hole 50 reaches the pin 22. In this position the lever 22a again jumps downwardly, whereby the pin 22 enters the tapered bored hole 50. Thus, the seat 1 is fixed in its pivoted-in stored position.

FIG. 13 shows the backrest carrying plate 27 embodied as a milled part as viewed in the direction of the arrow XIII in FIG. 5. The production of high strength, light structural components by means of milling is typical in the aircraft industry, whereby the advantage is put to use that the pertinent parts can be optimally adapted to the loads at hand. Typical structural components of this type in principle always comprise an open or closed milled skin which is stiffened in an appropriate manner by ribs. In this context such a milled construction is a further development of a sheet metal construction, whereby the separate elements of the structural component, such as the skin and the ribs, are manufactured of sheet metal and connected to one another by riveting. However, the milled construction is advantageous relative to the sheet metal construction insofar as riveting overlaps and the point force transmission in the regions of the separate rivets are thereby eliminated. Since the ribs are integrated in a one-piece manner with the skin to form one part, such milled parts are also named integral structural components, integral parts, or integral plates. A finished milled part of this type only contains approximately 10% of the originally present material and was previously regarded as quite expensive in comparison to parts produced in a different manner due to the necessary machining expenditure. Only since a larger number of equivalent milled parts may be simultaneously produced in a numerically controlled milling operation, is milling competitive with casting or die casting with regard to production costs.

The backrest carrier plate 27 comprises a milled skin 51 with stiffening ribs 52 in the upper portion and diagonally crossed ribs 52' in the lower region 63 for the backrest. The ribs 52' have top flanges 53 according to the invention, whereby, the ribs 52' protruding from the skin 51 have a T-shaped cross-section. Another top flange 57 is integrated in a one-sided manner with the respective rib so that the cross-section of this rib comprises an inverted L-shape. The integrated head part of the seat will be formed by the upper region 64 of the integral backrest carrier plate 27. Here, guide elements 58 and a belt return guide 59 are integrated. The guide elements 58 are used with the arrangement of automatic belt retracting rollers 23, whereas the return guide 59 is provided for rigidly mounted shoulder belts of which the secured ends are held by an integrated bail 65. Thus, the possibilities of a milled construction are used to integrate elements into the backrest carrier plate 27 in a one-piece manner which previously were produced and mounted as separate structural components. Threaded insert bores 56 are provided for securing the automatic belt retracting rollers and for securing carrying elements. Due to the bores 60, the backrest carrier plate 27 may be attached by screws to the side struts 10, 10'. The threaded bores 61 and the through-hole bores 62 serve for securing the belt pan. Cut-outs 54 and bores 55 are provided for reducing the weight. As shown in FIG. 5, the backrest carrier plate 27 is installed in such a manner that the milled skin 51 faces the cushions. The flanges 53 and 57 and the ribs 52 and 52' form the rear limit of the carrier plate 27. An essential characteristic of this plate is seen in that besides the stiffening ribs it comprises all further necessary elements or provisions for mounting the plate itself as well as for mounting all further structural components connected with the plate.

Figure 14:
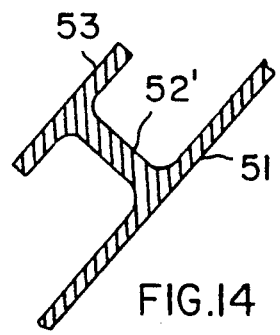
FIG. 14 shows a section 14—14 according to FIG. 13.

FIG. 14 shows a section through a rib 52' according to FIG. 13. Here, the T-shaped cross-section of the rib 52' is seen which is formed by the integration of the flage 53. The milled part forms a quasi-double-T carrying element with the milled skin 51 as the lower flange, the rib 52' as a web, and the upper flange 53.

FIG. 15 shows the milled seat plate 25. Here also the ribs 52' are provided with flanges 53 and thereby have a T-shaped cross-section. The milled skin 51, as well as the corner node points, comprise bores 55 for reducing the weight. The seat plate 25 is bounded by the sides 66, 67, 68, and 71 and is provided with axial bores 70, whereby the skin 69 covers the axial spring 37 shown in FIG. 8. The threaded bores 72, and the pin bores 73, on the extension 24, are provided for securing the locking mechanism 13, whereby the extension 24 is integrated with the plate 25 in the above described manner.

FIG. 16 shows the view in the direction of the arrow 16 in FIG. 15. Here, the thickness d of the plate 25 and the position of the bores 70 and the skin 69 are shown.

As a result of the embodiment, especially of the seat plate 25, and of the backrest carrier plate 27 as integral structural milled components, the possibilities of the milling process are put to good use here, to incorporate all the elements necessary for reasons of strength, such as the skin, ribs, edge carriers, and all elements necessary for mounting, such as the threaded bores, through-hole bores, extensions, etc. in a one-piece manner, into the respective structural parts.

Although the invention has been described with reference to specific example embodiments, it will be appreciated, that it is intended to cover all modifications and equivalents within the scope of the appended claims.

We claim:

1. A tiltable seat structure, especially for a flight attendant in an aircraft, comprising a seat section with a one-piece seat plate and a backrest section with a one-piece backrest carrier plate, first hinging means for journalling said seat section to said backrest section, first spring means urging said seat section up against said backrest section, second hinging means for journalling said backrest section and said seat section to a structural member of said aircraft, second spring means for automatically biasing said backrest section with said seat section into a storage position in a recess in said structural member when said seat section is in an upright position, first locking means 13, 14; 41) secured to said seat section for locking said seat section in a use-position, second locking means (22a) secured to said backrest section for locking said backrest section and said seat section in said storage position, a tapered pin (22) secured in a fixed location to said aircraft structure in a position for cooperating with said first locking means to hold said seat section in its use position and for further cooperating with said second locking means (22a) to hold said backrest section and said seat section in said stored position in said recess, whereby said tapered pin (22) holds said seat in said use-position and in said storage position.

2. The seat structure of claim 1, further comprising single-piece side struts (10, 10') secured to said one-piece backrest carrier plate, said first hinging means securing said seat section to said single-piece side struts.

3. The seat structure of claim 1, wherein said one-piece backrest carrier plate comprises integral stiffening ribs and means for mounting as integral components of said one-piece backrest carrier plate.

4. The seat structure of claim 3, wherein said integral ribs (52, 52') comprise top flanges (53) for forming a T-cross-section.

5. The seat structure of claim 3, wherein said integral ribs (52, 52') comprise one-sided flanges (57) for forming an L-cross-section.

* * * * *